(12) United States Patent
Beelen et al.

(10) Patent No.: US 7,492,991 B2
(45) Date of Patent: Feb. 17, 2009

(54) ARRAYED WAVEGUIDE GRATING WITH REDUCED CHANNEL PASSBAND ASYMMETRY

(75) Inventors: Gunter B. L. Beelen, Zoutleeuw (BE); Hindrick F. Bulthuis, Edinburgh (GB)

(73) Assignee: Gemfire Corporation, Fremont, CA (US)

( * ) Notice: Subject to any disclaimer, the term of this patent is extended or adjusted under 35 U.S.C. 154(b) by 0 days.

(21) Appl. No.: 11/737,275

(22) Filed: Apr. 19, 2007

(65) Prior Publication Data

US 2007/0274632 A1 Nov. 29, 2007

Related U.S. Application Data

(60) Provisional application No. 60/746,007, filed on Apr. 28, 2006.

(51) Int. Cl.
 *G02B 6/10* (2006.01)
(52) U.S. Cl. .......................... 385/37; 385/129
(58) Field of Classification Search ............ 385/37, 385/129–132
 See application file for complete search history.

(56) References Cited

U.S. PATENT DOCUMENTS

| | | |
|---|---|---|
| 3,937,557 A | 2/1976 | Milton |
| 3,995,937 A | 12/1976 | Baues et al. |
| 4,139,259 A | 2/1979 | Kersten et al. |
| 4,240,694 A | 12/1980 | Pan |
| 4,262,995 A | 4/1981 | Tangonan |
| 4,305,641 A | 12/1981 | Witte |
| 4,318,586 A | 3/1982 | Coyne |
| 4,360,248 A | 11/1982 | Bickel et al. |
| 4,484,794 A | 11/1984 | Witte |
| 4,523,803 A | 6/1985 | Arao et al. |
| 4,566,753 A | 1/1986 | Mannschke |

(Continued)

FOREIGN PATENT DOCUMENTS

CA 1317136 6/1988

(Continued)

OTHER PUBLICATIONS

International Search Report mailed Feb. 25, 2008 in PCT/US07/67340.

(Continued)

*Primary Examiner*—Kevin S Wood
(74) *Attorney, Agent, or Firm*—Warren S. Wolfeld; Haynes, Beffel & Wolfeld LLP

(57) ABSTRACT

Roughly described, arrayed waveguide grating apparatus includes one or more input and/or output waveguides which are shaped and oriented such that optical energy communicated with the waveguide array is, within a distance of no more than 1 mm into the mouth of the waveguide, directed substantially in-line with the optical centerline of the waveguide. In one embodiment, the waveguides are shaped and oriented such that the optical energy enters or exits the waveguide substantially-line with the optical centerline of each waveguide. In another embodiment the waveguides are shaped and oriented such that optical energy is, at the mouth of each waveguide, directed off-axis, and the waveguide includes mode conversion means such that optical energy is directed substantially in-line with the optical centerline within a distance of no more than 1 mm into the mouth of the waveguide. The mode conversion means may, for example, include a non-adiabatic lateral optical centerline shift.

33 Claims, 16 Drawing Sheets

U.S. PATENT DOCUMENTS

| | | | |
|---|---|---|---|
| 4,652,081 | A | 3/1987 | Fatatry |
| 4,653,849 | A | 3/1987 | Boirat et al. |
| 4,786,131 | A | 11/1988 | Mahapatra et al. |
| 5,701,371 | A | 12/1997 | Ishida et al. |
| 6,594,409 | B2 | 7/2003 | Dutt et al. |
| 6,768,842 | B2 | 7/2004 | Bulthuis et al. |
| 7,003,195 | B1 | 2/2006 | Huang et al. |
| 7,327,918 | B2 * | 2/2008 | Yamazaki et al. ............. 385/48 |
| 2004/0170354 | A1 | 9/2004 | Anton et al. |
| 2004/0240787 | A1* | 12/2004 | Yi ............................... 385/37 |
| 2006/0177180 | A1* | 8/2006 | Tazawa et al. ................ 385/37 |

FOREIGN PATENT DOCUMENTS

| | | |
|---|---|---|
| DE | 7808787 | 6/1978 |
| DE | 3884089 | 5/1988 |
| EP | 0048408 | 2/1985 |
| EP | 0301194 | 9/1993 |
| EP | 1443349 | 8/2004 |
| JP | 56-19002 | 2/1981 |
| JP | 58-70202 | 4/1983 |
| JP | 59-24804 | 2/1984 |
| JP | 64-044901 | 2/1989 |
| JP | 08-007287 | 1/1996 |
| JP | 11-271557 | 10/1999 |
| WO | 2004034530 | 4/2004 |

OTHER PUBLICATIONS

Smit, Meint K., et al., "A Normalized Approach to the Design of Low-Loss Optical Waveguide Bends," J. of Lightwave Tech. V. 11 N. 11, Nov. 1993, 1737-1742.

Hirono, T., et al., "Optimized Offset to Eliminate First-Order Mode Excitation . . ." IEEE Photonics Tech. Lett. vol. 10., No. 7, Jul. 1998, 982-984.

* cited by examiner

ARRAYED WAVEGUIDE GRATING WITH REDUCED CHANNEL PASSBAND ASYMMETRY

BACKGROUND

The present invention relates to arrayed waveguide gratings (AWGs), and more particularly to AWG arrangements with reduced channel passband asymmetry.

AWGs, sometimes also known as "phasars" or "phased arrays", are well known components in the optical communications network industry. An AWG is a planar structure comprising an array of waveguides arranged side-by-side which together act like a diffraction grating. AWGs can be used as multiplexers and as demultiplexers, and a single AWG design can commonly be used both as a multiplexer and demultiplexer. The construction and operation of such AWGs is well known in the art. See for example, "PHASAR-based WDM-Devices: Principles, Design and Applications", M K Smit, IEEE Journal of Selected Topics in Quantum Electronics Vol. 2, No. 2, 20 Jun. 1996, and U.S. Pat. No. 5,002,350 and WO97123969, both incorporated by reference herein.

FIG. 1 illustrates the layout of a conventional AWG. It comprises a substrate ("die", "chip") 100 supporting one or more input optical waveguides 110 delivering optical energy into an "input slab" region 112. The slab region is a planar waveguide which confines the input optical energy in only the vertical dimension; the energy is permitted to spread transversely without restriction. The input slab is sometimes referred to herein as an "input free space region", or an "input free propagation region". Note that despite the implication of these terms, energy spreads freely in these regions only in the transverse dimension; it remains confined vertically.

An image of the input optical energy (or an interference pattern, if there is more than one input optical waveguide) is developed on the far boundary 114 of the input free space region 112. At this boundary the light enters the input end 116 of a waveguide array 118 which consists of tens or hundreds of individual waveguides. The array waveguides are of lengths which increase linearly across the array, each waveguide having a length which differs from its nearest adjacent waveguide by a value ΔL.

Optical energy exits the waveguide array 116 at an output end 120 thereof, and delivers the light into an "output slab" region 122. Like the input slab, the output slab region is a planar waveguide which confines the input optical energy in only the vertical dimension. The energy is permitted to spread transversely without restriction, and for that reason the output slab is sometimes referred to herein as an "output free space region", or an "output free propagation region". In some embodiments the input and output free space regions overlap each other such that the input and output beams cross each other.

A diffraction pattern is developed on the far boundary 124 of the output free space region 122, where the light enters a set of one or more output optical waveguides 126. The structure can be used as a demultiplexer if there is only one input waveguide 110 and more than one output waveguide 126; in this case information can be carried on multiple channels (wavelengths) in the single input waveguide and the channels are separated out by the AWG for delivery into the different output waveguides. The structure can also be used as a multiplexer if operated in reverse. It can furthermore be used as a router if there are multiple input waveguides 110 and multiple output waveguide 126.

A problem that arises in AWG designs is that the passband spectrum of a given channel often can be asymmetrical in shape. Depending on the shape of the filter curve—"flat top" or "Gaussian"—the asymmetry may manifest itself in various forms. FIG. 2 illustrates this asymmetry for an AWG with flattened wavelength response (a so-called "Flat top" AWG). It can be seen that the passband asymmetry is most visible at the top of each filter passband shape, which appears slanted instead of flat. A typical example is shown more symbolically in FIG. 3. The response shown in FIG. 2 is from a 16×50 GHz Cyclic flat top AWG. It can be seen that the tilting of the top of the filter shape varies as a function of the channel number (i.e. as a function of wavelength).

The asymmetry referred to herein is asymmetry of the response about the intended center wavelength of a given channel. This asymmetry can be quantified in a number of different ways, but for purposes of the present description, for flat top devices, we quantify it in dB/nm as the slope of a straight line through two points spaced evenly around the central wavelength of the channel (see FIG. 3). This slope is sometimes referred to herein as the "tilt" of the response curve for the particular channel. For the spectrum shown in FIG. 2 the corresponding asymmetry values are given in FIG. 4. It can be seen that the asymmetry in this case varies from approximately −4 dB/nm to approximately 4 dB/nm.

For arrayed waveguide gratings with a Gaussian filter shape (Gaussian AWGs), the "tilt" is not evident in the response curve for a particular channel. Instead, asymmetry manifests itself as a channel dependent wavelength shift of the channel positions. FIG. 5 illustrates the response of a particular channel in a Gaussian AWG. The dotted line in FIG. 5 illustrates the intended (ideal) response curve and the solid line illustrates the response curve in which the asymmetry is included. The center wavelength shift arising due to the asymmetry is indicated as δλ. Again, while a number of different ways can be used to quantify the asymmetry for Gaussian AWGs, for purposes of the present discussion it is quantified as equal to the channel dependent wavelength shift. The asymmetry for an example Gaussian AWG is shown in FIG. 6. The device represented in this figure is a 40×100 GHz Gaussian AWG. On the horizontal axis the values 5 and 44 for CHANNEL_ID correspond with ITU frequencies of 192.1 THz and 196.0 THz respectively. On the vertical axis the difference between the channel positions and the ITU frequencies is given in nm. It can be seen that the asymmetry in this case varies from about −0.005 nm to about 0.005 nm.

It would be desirable to reduce or eliminate the channel passband asymmetry observed in conventional AWGs.

SUMMARY

Applicants have discovered that part of the channel passband asymmetry may be due to the entry of optical energy into the output waveguides at a slight angle to the optical centerline of the output waveguides. Such off-axis entry is believed to occur for waveguides that are off-center with respect to the array centerline, and is believed to induce asymmetry in the amount of power coupled to the fundamental waveguide mode with respect to the waveguide centerline. In other words: at an equal lateral distance from the waveguide axis the diffraction pattern will launch an unequal amount of optical power into the fundamental mode depending on whether the spot is on the left hand or the right hand side of the waveguide. The asymmetry is believed to cause a meandering of the light within the waveguide, which tends to resolve itself within about the first 2 mm of travel distance.

According to the invention, therefore, roughly described, arrayed waveguide grating apparatus includes one or more input and/or output waveguides which are shaped and oriented such that optical energy communicated with the waveguide array is, within a distance of no more than 1 mm into the mouth of the waveguide, directed substantially in-line with the optical centerline of the waveguide. In one embodiment, the waveguides are shaped and oriented such that the optical energy enters or exits the waveguide substantially-line with the optical centerline of each waveguide. In another embodiment the waveguides are shaped and oriented such that optical energy is, at the mouth of each waveguide, directed off-axis, and the waveguide includes mode conversion means such that optical energy is directed substantially in-line with the optical centerline within a distance of no more than 1 mm into the mouth of the waveguide. The mode conversion means may, for example, include a non-adiabatic lateral optical centerline shift.

In another aspect of the invention one or more of the input and/or output waveguides have optical centerlines which intersect the waveguide array centerline at a point which is not on the boundary where the array transitions to the free space region. The intersection point may be on the array centerline either upstream or downstream of the boundary, or it may be on the boundary but not on the array centerline, or it may be on neither the boundary nor the array centerline. In one embodiment the optical centerlines of all the output waveguides meet at a common point, whereas in another embodiment they do not.

In another aspect of the invention one or more of the input and/or output waveguides includes a non-adiabatic lateral optical centerline shift no more than 1 mm into the mouth of each of the waveguides.

Particular aspects of the invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 7:
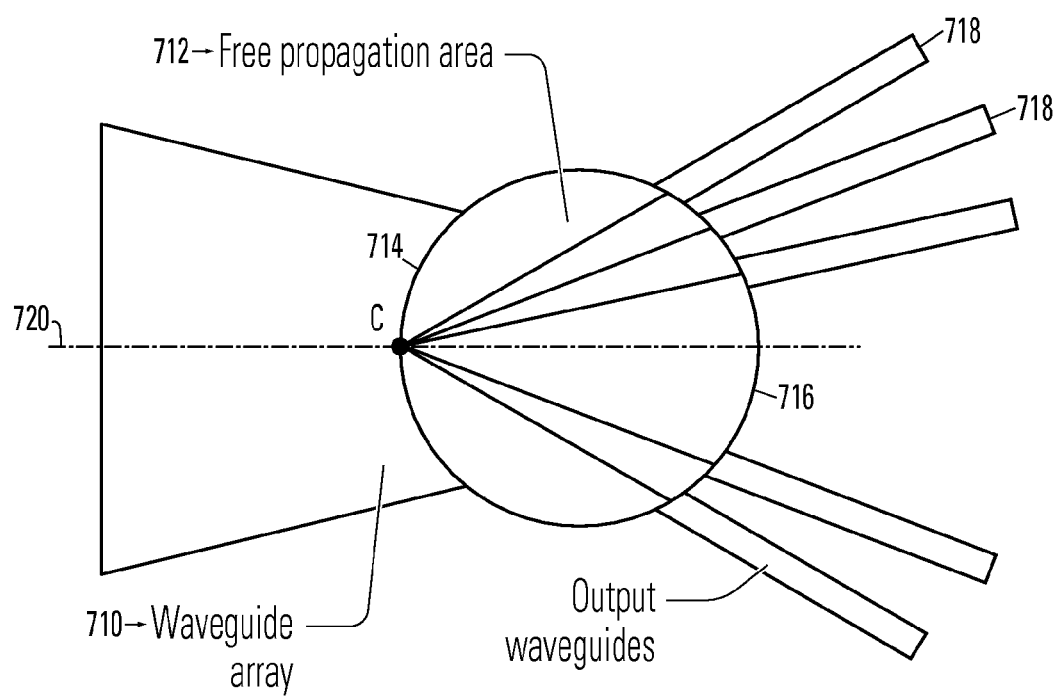
FIG. 7 illustrates the layout of the output portion of a conventional AWG.

FIG. 7 illustrates the layout of the output portion of a conventional AWG. The waveguide array 710 is shown symbolically and it will be understood that this region contains an array of individual waveguides arranged to act collectively as a diffraction grating. The waveguide array 710 delivers optical energy into the output free space region 712 along an input boundary 714 thereof, and causes a diffraction pattern to form at an output boundary 716 of the output free space region 712, with spatially separated intensity lobes corresponding to each of the wavelength channels present in the input signal. The diffraction pattern effectively distributes the optical energy laterally at the output boundary 716. Each lobe represents the optical signal in a different one of the channels present, with the shortest wavelength channels appearing toward the top in the drawing and the longest wavelength channels appearing toward the bottom. The output waveguides 718 are disposed at respective positions along the output boundary 716 at the lateral positions at which the individual channel lobes are formed. The horizontal dash-dot line 720 is referred to herein as the waveguide array optical centerline, as distinguished from the optical centerline of any individual input or output waveguide. It can be seen that in a conventional AWG, the centerlines of all the output waveguides 718 meet at a common point C which is located on the array centerline 720 at the boundary between the waveguide array and the output free space region 712.

As used herein, within the waveguide array, the "array centerline" curves with the waveguide array itself, but is considered to continue in straight lines both upstream and downstream of the array. The straight lines are the tangents to the array centerline where the array terminates. Since the array is curved, the array centerline upstream of the array is not usually in-line with the array centerline downstream of the array. Similarly, the optical centerline of an individual waveguide curves with the waveguide, but beyond the termination of the waveguide it is assumed to continue along a straight line tangent to the optical centerline at the waveguide termination.

Also as used herein, the term "light" means "optical energy", which need not be in the visible range of the electromagnetic spectrum. The two terms are used interchangeably herein.

Figure 1:
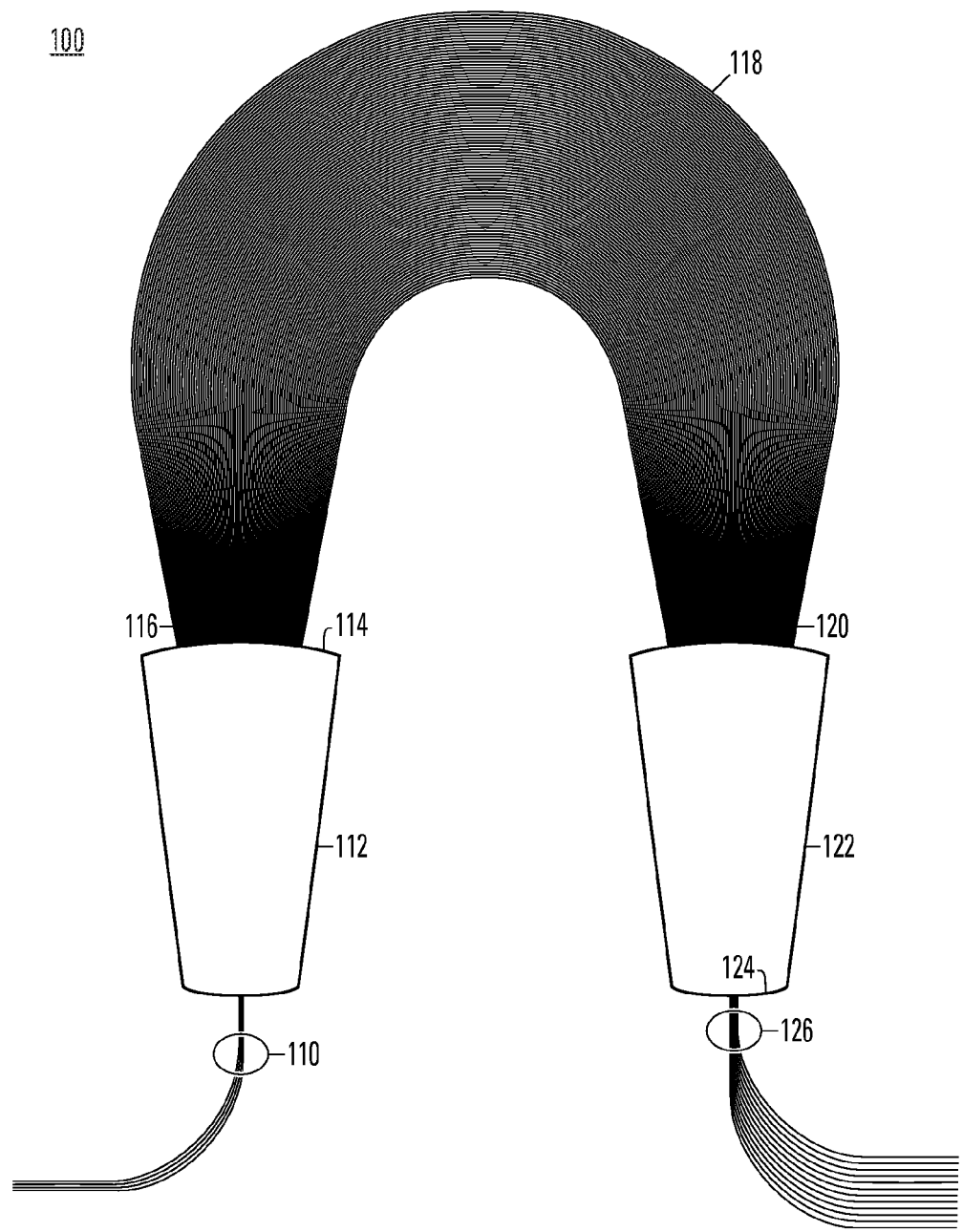
FIG. 1 illustrates the layout of a conventional AWG.
Figure 2:
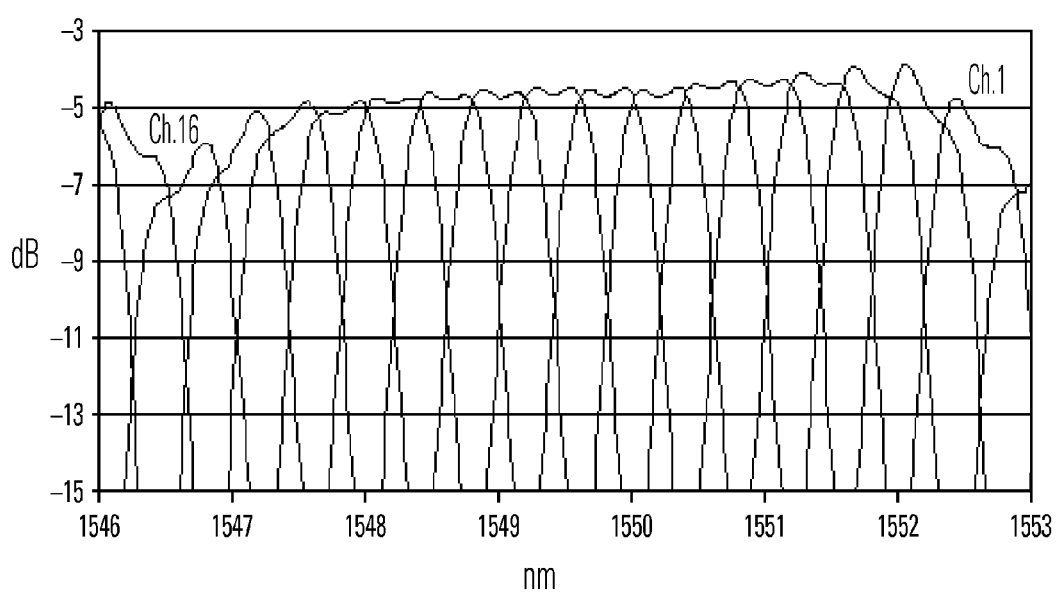
FIGS. 2-6 are charts illustrating channel passband asymmetries for various conventional AWGs.
Figure 3:
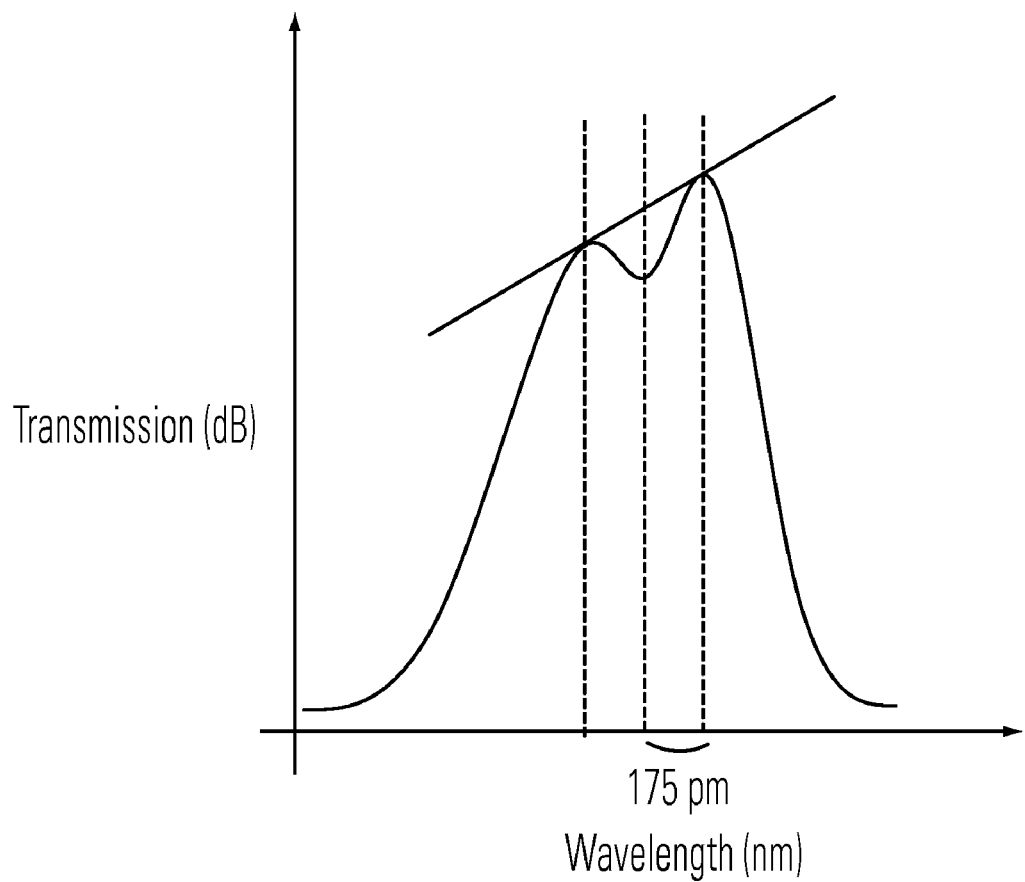
Figure 4:
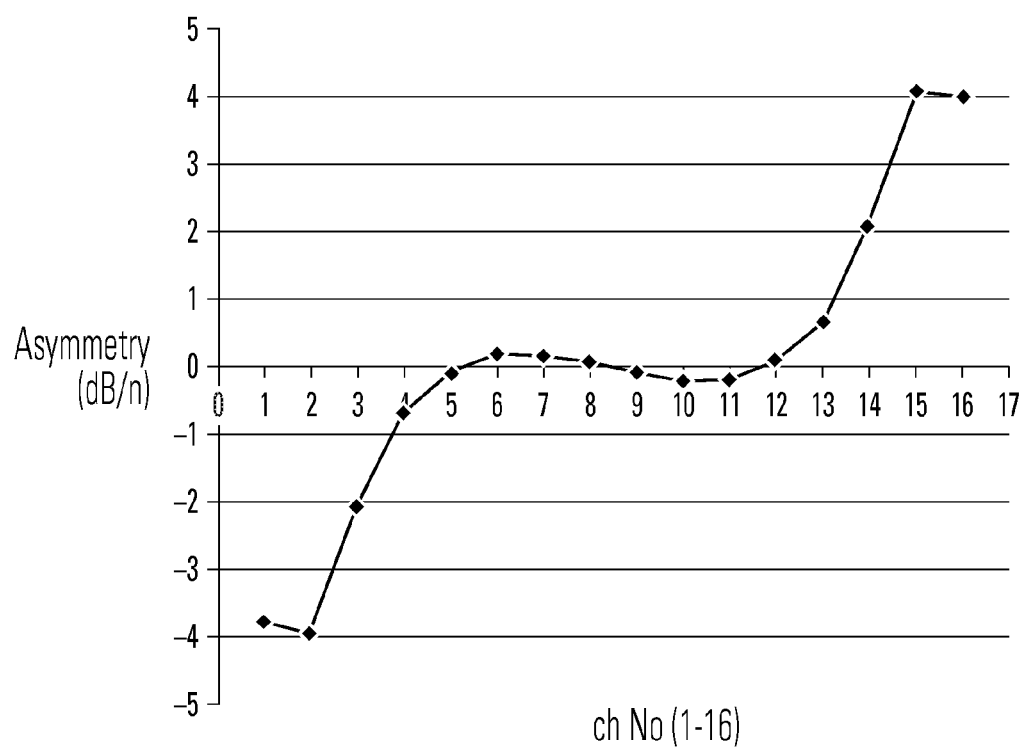
Figure 5:
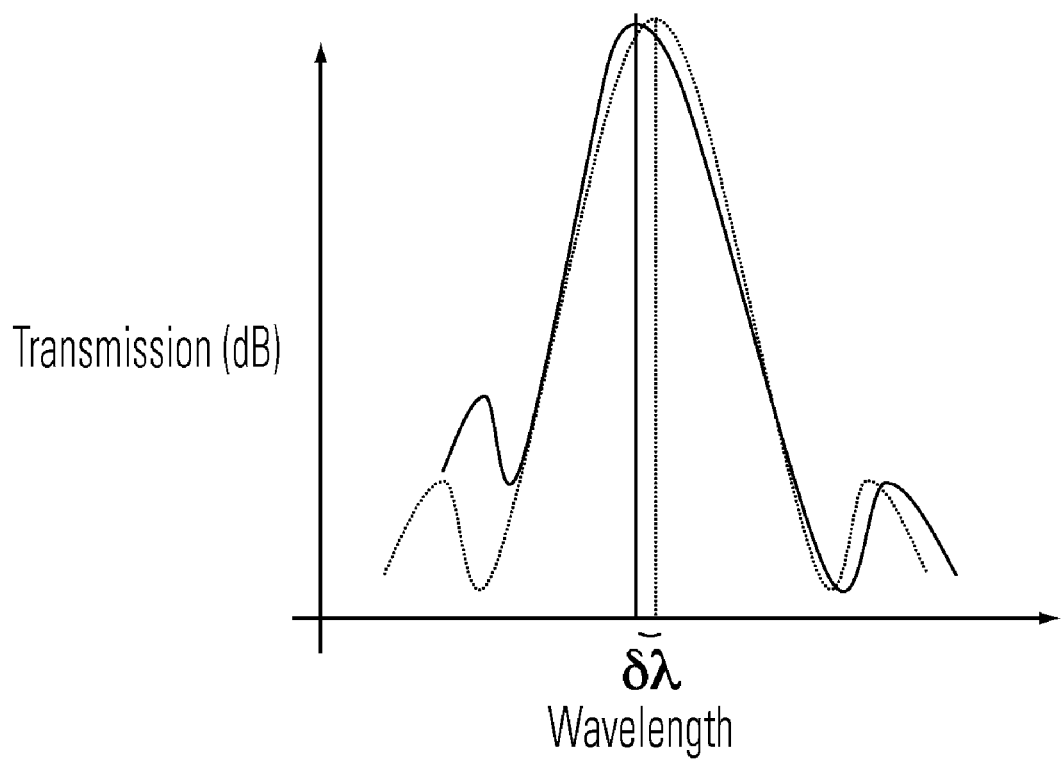
Figure 6:
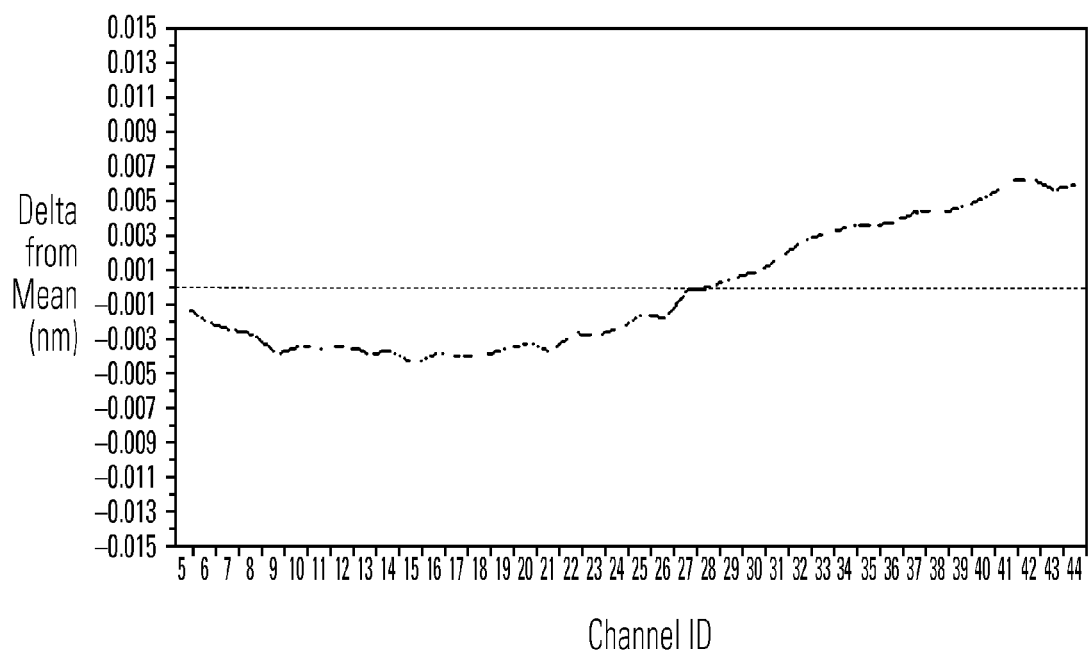

The output free space region 712 is shown as a circle in FIG. 7, but typically the input boundary 714 and the output boundary 716 form arcs of circles having different centerpoints. In particular, the centerpoint of the arc forming the output boundary 716 is situated on the array axis, half way between the output boundary 716 and the input boundary 714, and another point (not shown in FIG. 7), where the array axis intersects the output boundary 716, is the centerpoint of the arc forming the input boundary 714. Additionally, since the side portions of the free space region usually play no part in the operation of the AWG, so they are often cut off (see the shape of the output free space region 122 in FIG. 1). Also, it will be appreciated that while the free space regions are often though of as having structural features to mark their boundaries, in fact in many cases structural features are unnecessary; the waveguides of the waveguide array 710 and the output waveguides 718 can merely terminate at positions corresponding to the arcs that are shown in FIG. 7 as forming the input boundary 714 and the output boundary 716. The arcs on which they terminate are referred to herein as "boundaries", whether or not the arc is manifested as an arc physically in the device.

Figure 8:
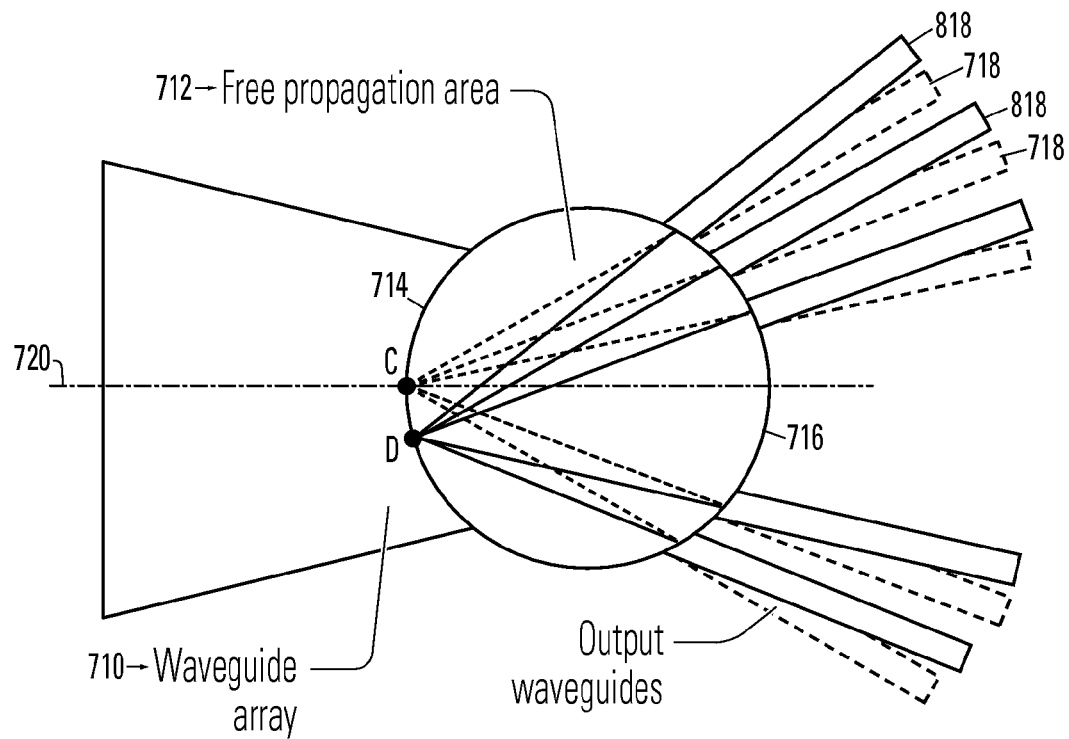
FIGS. 8, 13 and 14 illustrate layouts of the output portions of AWGs incorporating features of the invention.

FIG. 8 illustrates the layout of an AWG incorporating features of the invention. In FIG. 8, the output waveguides 818 have been rotated slightly so that their centerlines converge at a point D that is translated away from point C along the input boundary 714 of the output free space region 712. The original output waveguides 718 continue to be shown in dashed lines in FIG. 8. Stated another way, the optical centerlines of each of the output waveguides 818 now intersect the array centerline at points that do not coincide with the input boundary 714 of the output free space region 712. Stated yet another way, the optical centerlines of each of the output waveguides 818 now intersect the array centerline at angles which differ from their angles in the conventional structure of FIG. 7. The rotations are such as to better align the output waveguide centerlines with the true angle of entry of the light. In an example, the convergence point D may be translated with respect to point C by a distance that corresponds to an angular shift of the receiver waveguides of 0.0069 radian. Other variations may be incorporated for other reasons, such as laterally shifting the positions where the receivers meet the output boundary 716, or varying the length of the optical path to each of the receivers (thereby deviating the output boundary 716 from a true circle), but the change that affects channel passband asymmetry is the change in the angle that the centerline of each output waveguide makes with the array centerline.

Figure 9:
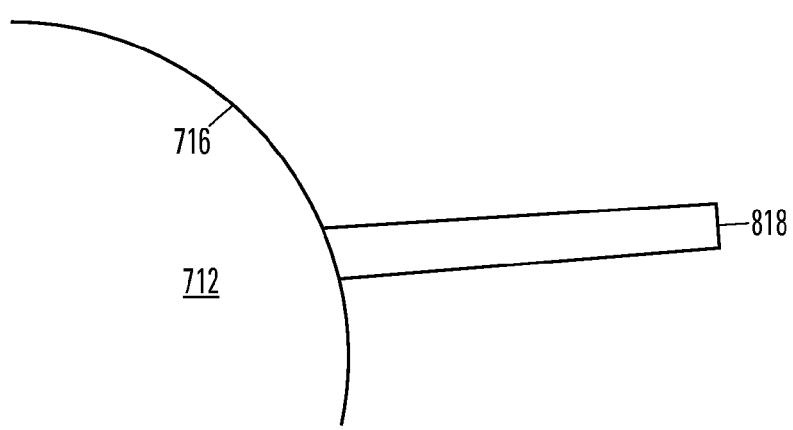
FIGS. 9-12 are detail views of the area in FIG. 8 where an output waveguide approaches the output free space region.
Figure 10:
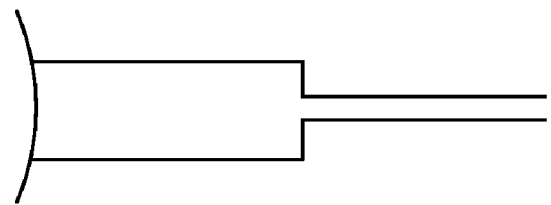
Figure 11:
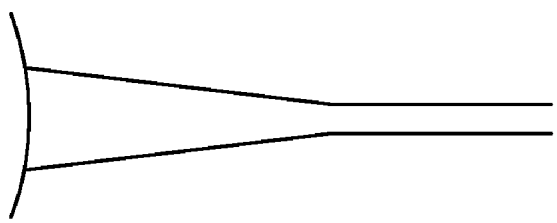
Figure 12:
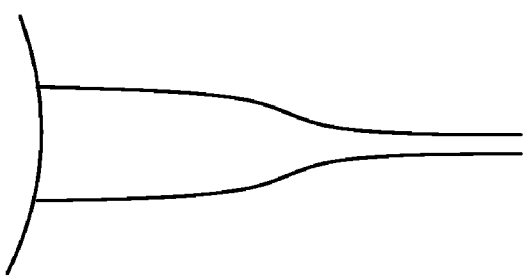

FIG. 9 is a detail view of the area where one of the output waveguides 818 approaches the output boundary 716 of output free space region 712. In this embodiment, the output waveguides 818 are of constant width all the way to the output boundary 716. In other embodiments the receiver portions might have another shape. FIGS. 10, 11 and 12 illustrate a few of the possible shapes for the receiver portion. The receiver portion can also have a shape that helps minimize channel passband asymmetry, as described below.

In the embodiment of FIG. 8, in which all the output waveguide centerlines continue to converge on a single convergence point D which remains on the input boundary 814 of the output free space region 812, the channel passband asymmetry is reduced by a constant amount for all channels. Because of this, the same modification could be made instead on the input side of the AWG; or part of the angle variation could be made on the input side and part on the output side.

As used herein, the "receiver" portion of an output waveguide refers to the end of the output waveguide where it opens into the output free space region. It need not coincide in length with the length of the structures shown in FIG. 10, 11 and 12. For an input waveguide, the end of the waveguide where it opens into the input free space region is sometimes referred to herein as an "emitter" portion of the input waveguide. If a waveguide is being discussed which can be either an input or an output waveguide, the end of the waveguide where it opens into its adjacent free space region is sometimes referred to herein as the "emitter/receiver" portion of the waveguide, or simply the "mouth" of the waveguide, and the free space region into which it opens is sometimes referred to herein as the "most immediate" free space region. Similarly, light exits from the mouth of an input waveguide into the input free space region and toward the input boundary of the waveguide array, and light is delivered to the mouth of an output waveguide from the output boundary of the waveguide array across the output free space region. If a waveguide is being discussed which can be either an input or an output waveguide, then as used herein, it is sometimes said that optical energy is "communicated" between the mouth of the waveguide and the array across one of the free space region. As used herein, "communicate" does not connote a direction. The "most immediate" boundary of the waveguide array through which the energy is communicated is the array output boundary if the waveguide being discussed is an output waveguide, or the array input boundary if the waveguide being discussed is an input waveguide.

Figure 13:
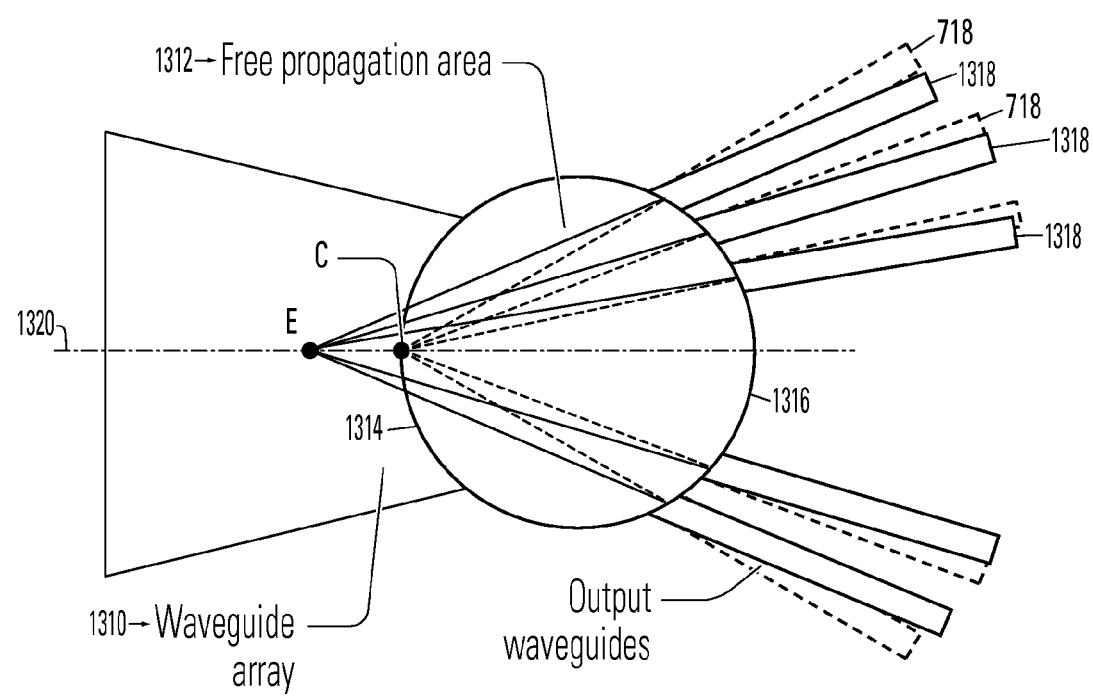

FIG. 13 illustrates another embodiment, in which the output waveguides are rotated slightly so that their centerlines converge at a point E that is on the array centerline, but more upstream than point C in FIG. 7, inside the waveguide array 1310. Stated another way, As in FIG. 8, the optical centerlines of each of the output waveguides 1318 now intersect the array centerline at points that do not coincide with the input boundary 1314 of the output free space region 1312, and the optical centerlines of each of the output waveguides 1318 now intersect the array centerline at angles which differ from their angles in the conventional structure of FIG. 7. Like FIG. 8, The original output waveguides 718 continue to be shown in dashed lines in FIG. 13. In an example, the convergence point E may be upstream of the boundary 1314 (inside the waveguide array 1310 in FIG. 13) by a distance that is perhaps 70% of the diameter of the output free space region 1312. In this embodiment, since all the output waveguide centerlines continue to converge on a single convergence point E, and the convergence point E remains on the waveguide array centerline 1320, the channel passband asymmetry is reduced by an amount that changes linearly with the position of the output receiver on the output boundary 1316. In another embodiment, the waveguide centerline angles might be changed in the opposite direction, such that the convergence center point is moved to a point downstream of the input boundary 1314 (inside the free space region 1312 in FIG. 13) instead of upstream of the input boundary 1314. In yet another embodiment, the variations of FIGS. 8 and 13 can be combined so that the convergence point is located at any desired position, away from the array centerline 1320 and away from the input boundary 1314 of the output free space region 1312.

Figure 14:
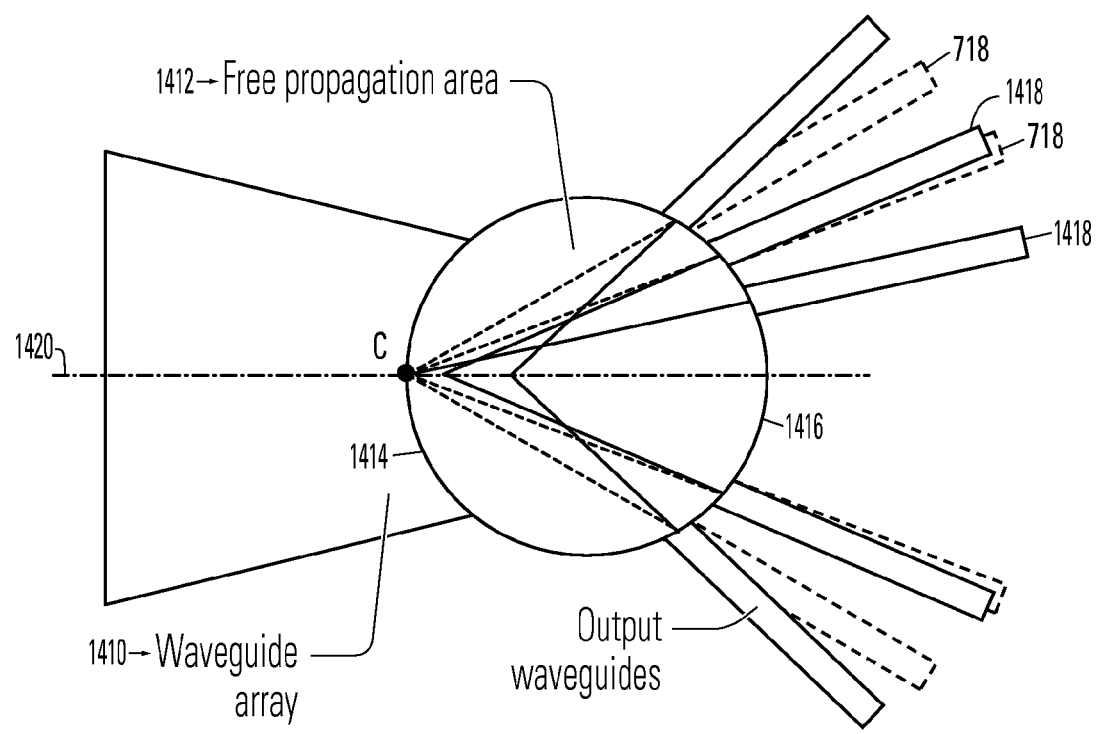

FIG. 14 illustrates yet another embodiment, in which further angle corrections are added to the individual output waveguides 1418 to fine tune the asymmetry correction for each channel individually. The FIG. 14 embodiment points out that the receiver waveguide centerlines need not converge at a single point. In addition, while the drawing of FIG. 14 shows the centerline of each output waveguide 1418 intersecting the array centerline 1420 at the same position as the centerline of a corresponding output waveguide 1418 on the opposite side of the array centerline 1420, there is no requirement that this be true in all embodiments. Different output waveguides may require different angle corrections than their respective symmetrically opposite output waveguides. Moreover, whereas in FIG. 14 all the asymmetry reduction occurs due to angle corrections in the output waveguides, in another embodiment a constant portion of the asymmetry reduction can occur by angle corrections formed in the input waveguides. In the latter arrangement only the remainder of the asymmetry reduction occurs by angle corrections (including all of the channel-specific angle corrections) formed in the output waveguides.

The amount of angle correction to make for each input and/or output waveguide can be determined by trial-and-error or through BPM simulations. It will be appreciated that exact on-axis entry or exit into or out of the waveguide is not necessarily required in all embodiments; some improvement in channel passband asymmetry should be obtained as long as the entry or exit angle is more in-line with the waveguide optical centerline than in the conventional arrangement.

In an example, the output waveguides of a 16×50 GHz Cyclic Flat Top AWG are given a constant angular offset of 0.0069 radian. As a result, the asymmetry of every channel is changed by the same constant amount due to the change in output waveguide angle. For this device the change in asymmetry per unit of angle is 330 dB/nm/rad.

In second and third examples the receivers of a 16×50 GHz cyclic flattop AWG are given different convergence points moved inside the array along the optical centerline of the AWG by a distance which is expressed as a percentage of the diameter of the output free space region. (As used herein, the "diameter" of a free space region is the distance between the input and output boundaries of the free space region along the array axis.) In the second example the distance into the array is 70% of the diameter of the output free space region, and in the third example the distance into the array is 90% of the diameter of the output free space region. As a result, the channel passband asymmetry is reduced to a range of about −0.7 to 1.3 dB/nm in the second example and is reduced to a range of about −1.5 to 1.3 dB/nm in the third example.

In a fourth example, the channel dependent asymmetry of a 16×50 GHz cyclic AWG is calculated with BPM simulations. The change in asymmetry per unit of angle is also calculated and found to be 500 dB/nm/rad. With this value the output waveguide angles are modified so as to remove the asymmetry.

In a fifth example the receiver angles of a 16×50 GHz cyclic AWG are modified individually in order to remove asymmetry. The original and the corrected angles are listed (in rads) in Table I. A significant reduction in the channel dependent asymmetry can be observed. Further improvements can be expected by further optimizing the receiver angles.

TABLE I

|  | Original angles | Modified angles | Difference |
|---|---|---|---|
| 1 | −0.05883 | −0.0713 | −0.012466 |
| 2 | −0.05097 | −0.0589 | −0.007934 |
| 3 | −0.04311 | −0.0473 | −0.004191 |
| 4 | −0.03526 | −0.0366 | −0.001344 |
| 5 | −0.02742 | −0.02752 | −0.000109 |
| 6 | −0.01958 | −0.01918 | 0.000399 |
| 7 | −0.01174 | −0.01137 | 0.000371 |
| 8 | −0.00391 | −0.00376 | 0.000153 |
| 9 | 0.00391 | 0.003759 | −0.000153 |
| 10 | 0.01173 | 0.011353 | −0.00038 |
| 11 | 0.01955 | 0.019195 | −0.000355 |
| 12 | 0.02736 | 0.027464 | 9.91E−05 |
| 13 | 0.03518 | 0.036506 | 0.001329 |
| 14 | 0.04299 | 0.047123 | 0.004136 |
| 15 | 0.0508 | 0.058932 | 0.008136 |
| 16 | 0.0586 | 0.071696 | 0.013092 |

Alternative Group of Embodiments

Figure 15:
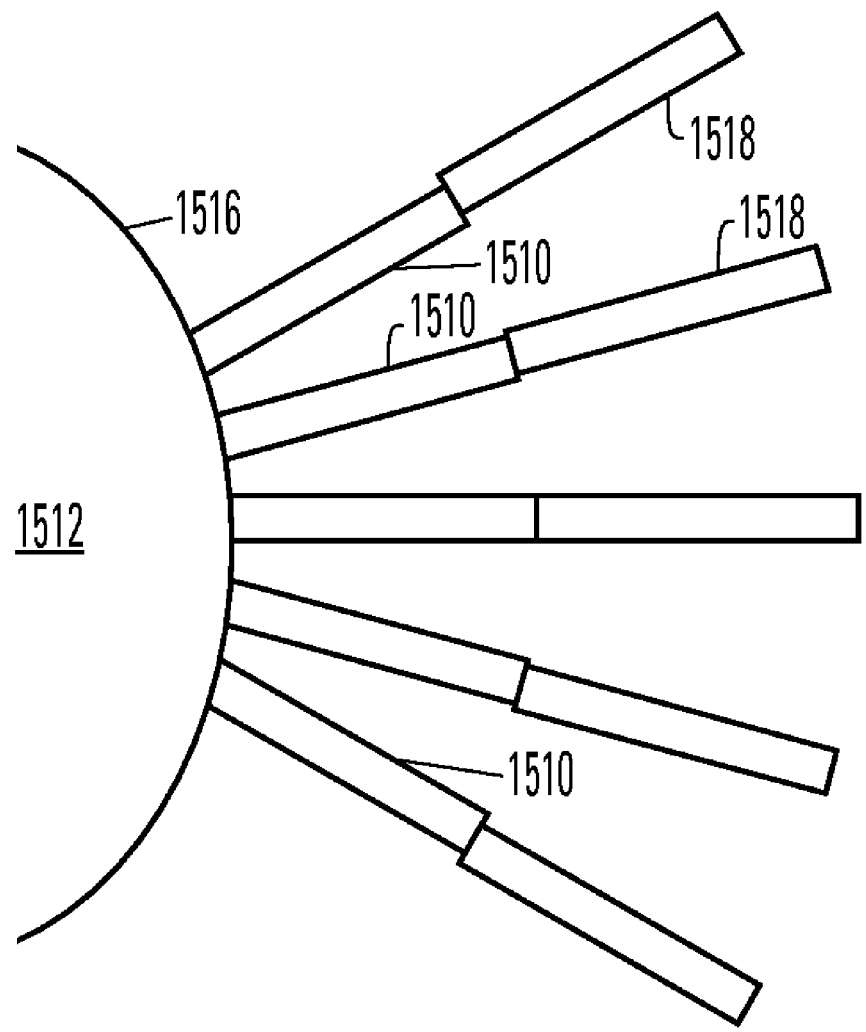
FIG. 15 is a detail view of the area where output waveguides approach the output free space region in an embodiment of the invention.
Figure 16:
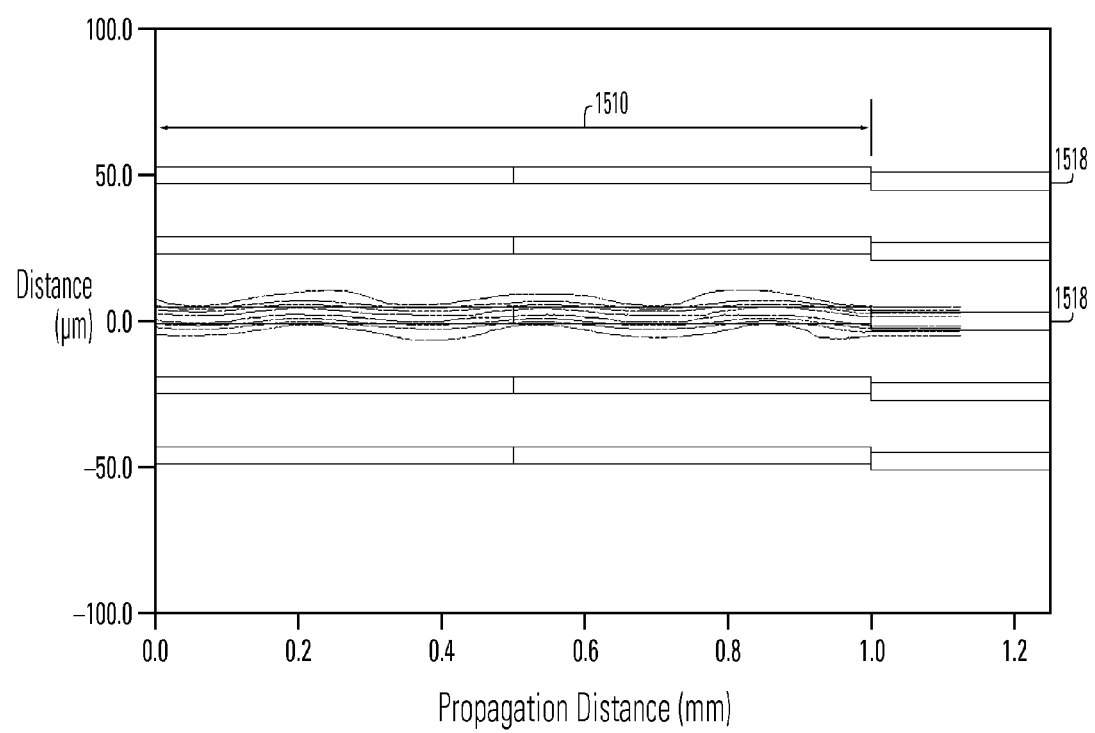
FIG. 16 illustrates a path of travel of light in one of the output waveguides of FIG. 15.
Figure 17A:
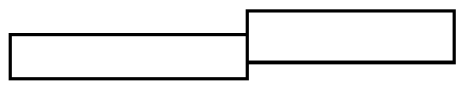
FIGS. 17A-17E (collectively "FIG. 17") and 18A-18C (collectively "FIG. 18") illustrate example waveguide shapes which can be used in embodiments of the invention.
Figure 17B:
Figure 17C:
Figure 17D:
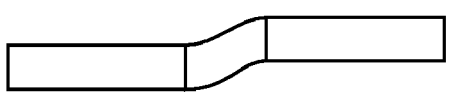
Figure 17E:
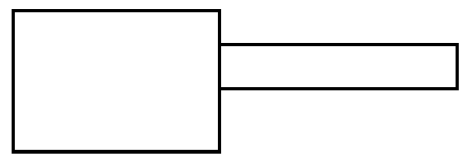

The phase and amplitude conditions in the output waveguides that led to the cancellation of asymmetry in the embodiments of FIGS. 8, 13 and 14 can be created by other mechanisms as well. One alternative approach is to allow light to enter or exit the waveguide off-axis, but to include mode conversion means at or near the mouth of the waveguide for converting the first order mode back to the fundamental. Typically the mode conversion is accomplished by appropriate waveguide shaping. FIG. 15 illustrates one such embodiment in which the waveguide shape incorporates a lateral centerline shift at a distance 1510 from the boundary 1516 of the adjacent free space region 1512. The light propagating in the receiver portion 1510 meanders laterally in the receiver portion, due to the off-axis entry of the light from the output free space region 1512. FIG. 16 illustrates this meandering. It can be seen that after the shift, beating ceases and light travels only in-line with the optical centerline of the waveguide 1518. It can be seen that in order that the downstream waveguide portion best capture the meandering light, the shift should be located at a distance and with an appropriate shift amount such that the meandering light enters the downstream portion on-axis. This should occur within about 1 mm of the boundary 1516 because much beyond that distance it is difficult to calculate the light path with sufficient accuracy. Also, much beyond that distance the meandering has significantly weakened in strength and much of the channel passband asymmetry has already been imparted. Preferably the mode conversion should occur within three or four periods of the beat.

The light contours shown in FIG. 16 may be, for example, for a centerline offset of 2 um occurring at about 200 um from the boundary 1516 of the free space region 1512. The technology for which this simulation is carried out is characterized by a core index of 1.455 a background index of 1.445, typical for Silica, a wavelength of 1.55 um and a waveguide which has a cross section dimension of 6×6 um.

Because of the meandering, if the length of the receiver portion 1510 and offset distance are chosen advantageously, then the light will strike the entry of the output waveguide 1518 on-axis, thereby affecting asymmetry of the channel passband in a manner similar to that in which the on-axis entry of light into the receivers in the first group of embodiments affects asymmetry of the channel passband.

The angle at which the light enters the downstream portion of a waveguide 1518 depends on the amplitude and phase of the first order mode, which is in turn controlled by the sign and magnitude of the transverse waveguide offset and by the length of the portion between the free space region and the offset. Accordingly, with proper choice of the transverse waveguide offsets and the lengths of the receiver initial portions, on-axis entry of light into each receiver's subsequent portion can be achieved. It will be appreciated further that exact on-axis entry into the subsequent portion is not necessarily required in all embodiments; some improvement in channel passband asymmetry should be obtained as long as the entry angle into the subsequent portion is more in-line with the waveguide optical centerline than was the light entry into the mouth portion 1510. Preferably, though, the waveguide should be shaped such that on the far side of the mode conversion, optical energy is directed "substantially" in-line with optical centerline, meaning that the power in the first order mode is at least 40 dB down from that in the fundamental mode.

In the embodiment of FIG. 15, the magnitudes of the lateral offsets in the various output waveguides 1518 increase with greater distance from the center channel output waveguide. This is because channel passband asymmetry tends to increase with greater channel distance from the center channel. In another embodiment the offset has a constant magnitude and instead the length of the section between the free space region and the offset is varied. In yet another embodiment both modifications are used together.

In this alternative group of embodiments, the initial portions 1510 of the output waveguides may be multimodal in order to accommodate the first order mode adequately. However, a single mode waveguide may suffice instead in many embodiments if the initial portions 1510 are kept short enough such that the first order mode does not lose too much power before reaching the discontinuity. Various receiver shaping options (such as those shown in FIGS. 10, 11 and 12) can also be incorporated.

Figure 18A:
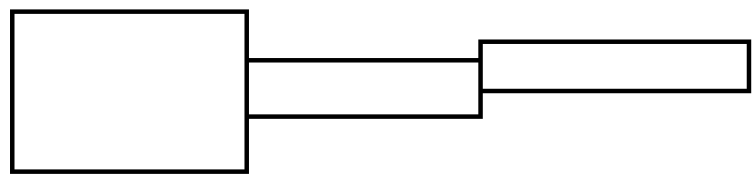
Figure 18B:
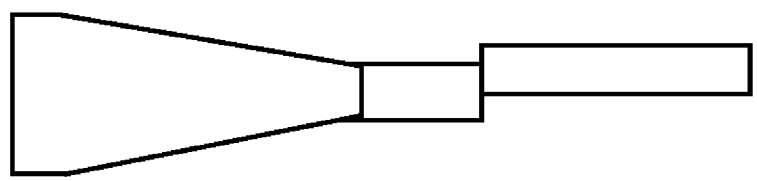
Figure 18C:
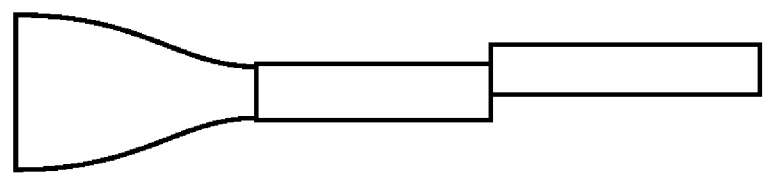

It can be seen that an optical centerline discontinuity can capture meandering light. In fact any asymmetric transition which in reverse would excite a first order mode would work equivalently to the simple offset depicted in FIG. 15. FIGS. 17A-17E illustrate several additional examples. The example of FIG. 17D points out that the transition need not be abrupt, so long as it is not so smooth as to be adiabatic. It will also be appreciated that the discontinuity can be formed in slightly more complex waveguide structures which include mode shaping tapers, horns, MMI, TMI etc. frequently encountered in AWG designs. See FIGS. 18A-18C for examples. Furthermore, it should be noted that an embodiment can combine the features of this alternative embodiment with features of one of the first group of embodiments, such that part of the asymmetry correction occurs due to the angle at which light enters the initial portion of the receivers and part occurs due to the angle at which light enters the subsequent portion of the receivers.

Figure 19:
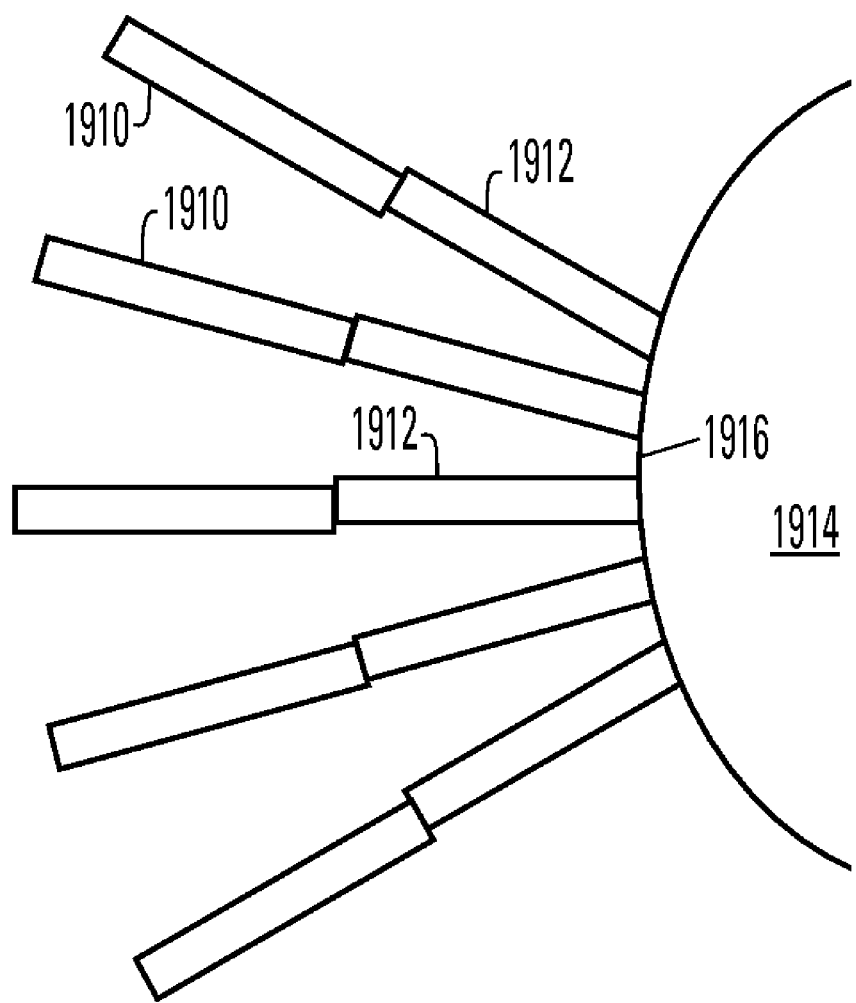
FIG. 19 is a detail view of the area where input waveguides approach the input free space region in an embodiment of the invention.

Finally, the mechanism of a lateral centerline shift can also be applied to the input waveguides on the input side of an AWG, as shown in FIG. 19. A correction made in the input waveguides produces a constant effective angle correction in the angle of entry into the output waveguides. As shown in FIG. 19 the input waveguides each have a mouth portion from which light exits into the input free space region 1914 off-axis with respect to the waveguide optical centerline, but upstream of the centerline shift the light was traveling in-line with the waveguide optical centerline. The design and analysis of this arrangement is the same as for the output waveguides, but in reverse. In addition, all the mechanisms described above for common or individual angle corrections to optimize the light entry angle for each output waveguide, can also be applied to the input waveguides in the same way as described above for the output waveguides.

While the present invention is disclosed by reference to the preferred embodiments and examples detailed above, it is understood that these examples are intended in an illustrative rather than in a limiting sense. It is contemplated that modifications and combinations will readily occur to those skilled in the art. For example, it will be appreciated that exact on-axis entry of light is optimal but not required in all embodiments. Partial benefits can be obtained if the angle of entry is closer to the optical centerline of the output waveguide, even if not exactly on-axis. It will be appreciated that these and other modifications and combinations will be within the spirit of the invention and the scope of the following claims.

What is claimed is:

1. Arrayed waveguide grating apparatus comprising:
a waveguide array having a plurality of waveguides arranged to form a diffraction grating and coupling together first and second free space regions, the waveguide array having an input end, an output end, and an array centerline;
an input group of at least one input waveguide, each of the input waveguides being disposed and oriented to launch input optical energy across one of the free space regions toward the input end of the waveguide array; and
an output group of at least one output waveguide, the output waveguides being disposed and oriented to receive optical energy delivered across one of the free space regions from the output end of the waveguide array to respective positions distributed transversely to the array centerline, each of the input and output waveguides having a respective optical centerline,
wherein one of the waveguides in either the input group or the output group is a particular waveguide,
and wherein the particular waveguide has a mouth disposed off-center with respect to the array centerline, the particular waveguide being shaped and oriented such that optical energy communicated with the waveguide array is, within a distance of no more than 1 mm into the mouth of the particular waveguide, directed substantially in-line with the optical centerline of the particular waveguide.

2. Apparatus according to claim 1, wherein the particular waveguide is shaped and oriented such that optical energy communicated with the waveguide array is, at the mouth of the particular waveguide, directed substantially in-line with the optical centerline of the particular waveguide.

3. Apparatus according to claim 1, wherein the particular waveguide is shaped and oriented such that optical energy communicated with the waveguide array is, at the mouth of the particular waveguide, directed off axis with respect to the optical centerline of the particular waveguide,
and wherein the particular waveguide includes mode conversion means such that optical energy is directed substantially in-line with the optical centerline of the particular waveguide within a distance of no more than 1 mm into the mouth of the particular waveguide.

4. Apparatus according to claim 3, wherein the mode conversion means comprises a non-adiabatic lateral optical centerline shift no more than 1 mm into the mouth of the particular waveguide.

5. Apparatus according to claim 1, wherein the output group of output waveguides includes a plurality of output waveguides, each of the output waveguides being shaped and oriented such that optical energy communicated with the waveguide array is, within a distance of no more than 1 mm into the mouth of the respective output waveguide, directed substantially in-line with the optical centerline of the respective output waveguide.

6. Apparatus according to claim 5, wherein the particular waveguide is an input waveguide.

7. Apparatus according to claim 5, wherein the input group of input waveguides includes a plurality of input waveguides, each of the input waveguides being shaped and oriented such that optical energy communicated with the waveguide array is, within a distance of no more than 1 mm into the mouth of the respective input waveguide, directed substantially in-line with the optical centerline of the respective input waveguide.

8. Arrayed waveguide grating apparatus comprising:
a waveguide array having a plurality of waveguides arranged to form a diffraction grating and coupling together first and second free space regions, the waveguide array having an input end, an output end, and an array centerline;
an input group of at least one input waveguide, each of the input waveguides being disposed and oriented to launch input optical energy across a free space region toward the input end of the waveguide array; and
an output group of at least one output waveguide, the output waveguides being disposed and oriented to receive optical energy delivered across a free space region from the output end of the waveguide array to respective positions distributed transversely to the array centerline, each of the input and output waveguides having a respective optical centerline,
wherein one of the waveguides in either the input group or the output group is a particular waveguide,
and wherein the particular waveguide has a mouth disposed off-center with respect to the array centerline, the particular waveguide being shaped and oriented such that optical energy communicated with the waveguide array is directed substantially in-line with the optical centerline of the particular waveguide.

9. Apparatus according to claim 8, wherein the particular waveguide is an output waveguide, wherein the waveguides of the waveguide array terminate at the output end along a boundary, and wherein the optical centerline of the particular waveguide intersects the array centerline at a point which is upstream of the boundary.

10. Apparatus according to claim 8, wherein the particular waveguide is an output waveguide, wherein the waveguides of the waveguide array terminate at the output end along a boundary, and wherein the optical centerline of the particular waveguide intersects the array centerline at a point which is downstream of the boundary.

11. Apparatus according to claim 8, wherein the particular waveguide is an input waveguide, wherein the waveguides of the waveguide array terminate at the input end along a boundary, and wherein the optical centerline of the particular waveguide intersects the array centerline at a point which is upstream of the boundary.

12. Apparatus according to claim 8, wherein the particular waveguide is an input waveguide, wherein the waveguides of the waveguide array terminate at the input end along a boundary, and wherein the optical centerline of the particular waveguide intersects the array centerline at a point which is downstream of the boundary.

13. Apparatus according to claim 8, wherein one of the waveguides different from the particular waveguide, in either the input group or the output group, is an additional waveguide, and wherein the additional waveguide has a mouth disposed off-center with respect to the array centerline, the additional waveguide being oriented such that optical energy communicated with the waveguide array is directed in-line with the optical centerline of the additional waveguide.

14. Apparatus according to claim 13, wherein the particular waveguide is an input waveguide and the additional waveguide is an output waveguide.

15. Apparatus according to claim 13, wherein both the particular waveguide and the additional waveguide are input waveguides, wherein the waveguides of the waveguide array terminate at the input end along a boundary, and wherein the optical centerline of neither the particular waveguide nor the additional waveguide intersects the array centerline at the boundary.

16. Apparatus according to claim 13, wherein both the particular waveguide and the additional waveguide are output waveguides, and wherein the optical centerlines of the particular waveguide and the additional waveguide intersect the array centerline at different points.

17. Apparatus according to claim 8, wherein the first and second free space regions are distinct from each other.

18. Arrayed waveguide grating apparatus comprising:

a waveguide array having a plurality of waveguides arranged to form a diffraction grating and coupling together first and second free space regions, the waveguide array having an input end, an output end, and an array centerline;

an input group of at least one input waveguide, each of the input waveguides being disposed and oriented to launch input optical energy across one of the free space regions toward the input end of the waveguide array; and an output group of at least one output waveguide, the output waveguides being disposed and oriented to receive optical energy delivered across one of the free space regions from the output end of the waveguide array to respective positions distributed transversely to the array centerline, wherein one of the waveguides in either the input group or the output group is a particular waveguide, and wherein the particular waveguide has a mouth disposed off-center with respect to the array centerline, the particular waveguide being shaped and oriented such that optical energy communicated with the waveguide array is, at the mouth of the particular waveguide, directed off-axis with respect to the optical centerline of the particular waveguide, and is, within a distance of no more than 1 mm into the mouth of the particular waveguide, directed substantially in-line with the optical centerline of the particular waveguide.

19. Apparatus according to claim 18, wherein the particular waveguide comprises a non-adiabatic lateral optical centerline shift no more than 1 mm into the mouth of the particular waveguide.

20. Arrayed waveguide grating apparatus comprising:

a waveguide array having a plurality of waveguides arranged to form a diffraction grating and coupling together first and second free space regions, the waveguide array having an input end, an output end, and an array centerline, the waveguides terminating at their input ends along an array input boundary, and the waveguides terminating at their output ends along an array output boundary;

an input group of at least one input waveguide, each of the input waveguides being disposed and oriented to launch input optical energy across one of the free space regions toward the input end of the waveguide array; and an output group of at least one output waveguide, the output waveguides being disposed and oriented to receive optical energy delivered across one of the free space regions from the output end of the waveguide array to respective positions distributed transversely to the array centerline, wherein one of the waveguides in either the input group or the output group is a particular waveguide, and wherein the particular waveguide opens to one of the free space regions at a position which is off the array centerline, the particular waveguide having an optical centerline which intersects the array centerline at a point which is not on the array boundary through which the particular waveguide communicates optical energy most immediately.

21. Apparatus according to claim 20, wherein the particular waveguide is an output waveguide, and wherein the optical centerline of the particular waveguide intersects the array centerline at a point which is upstream of the array output boundary.

22. Apparatus according to claim 20, wherein the particular waveguide is an output waveguide, and wherein the optical centerline of the particular waveguide intersects the array centerline at a point which is downstream of the array output boundary.

23. Apparatus according to claim 20, wherein the particular waveguide is an input waveguide, and wherein the optical centerline of the particular waveguide intersects the array centerline at a point which is upstream of the array input boundary.

24. Apparatus according to claim 20, wherein the particular waveguide is an input waveguide, and wherein the optical centerline of the particular waveguide intersects the array centerline at a point which is downstream of the array input boundary.

25. Apparatus according to claim 20, wherein one of the waveguides different from the particular waveguide, in either the input group or the output group, is an additional waveguide, and wherein the additional waveguide opens to one of the free space regions at a position which is off the array centerline, the additional waveguide having an optical centerline which intersects the array centerline at a point which is not on the array boundary through which the additional waveguide communicates optical energy most immediately.

26. Apparatus according to claim 25, wherein the particular waveguide is an input waveguide and the additional waveguide is an output waveguide.

27. Apparatus according to claim 25, wherein both the particular waveguide and the additional waveguide are output waveguides.

28. Apparatus according to claim 25, wherein both the particular waveguide and the additional waveguide are input waveguides.

29. Apparatus according to claim 25, wherein both the particular waveguide and the additional waveguide are members of the same one of the input and output groups of waveguides, and wherein the optical centerlines of the particular waveguide and the additional waveguide intersect the array centerline at different points.

30. Apparatus according to claim 20, wherein the first and second free space regions are distinct from each other.

31. Arrayed waveguide grating apparatus comprising:

a waveguide array having a plurality of waveguides arranged to form a diffraction grating and coupling together first and second free space regions, the waveguide array having an input end, an output end, and an array centerline, the waveguides terminating at their input ends along an array input boundary, and the waveguides terminating at their output ends along an array output boundary;

an input group of at least one input waveguide, each of the input waveguides being disposed and oriented to launch input optical energy across one of the free space regions toward the input end of the waveguide array; and an output group of at least one output waveguide, the output waveguides being disposed and oriented to receive optical energy delivered across one of the free space regions from the output end of the waveguide array to respective positions distributed transversely to the array centerline, wherein one of the waveguides in either the input group or the output group is a particular waveguide, and wherein the particular waveguide has a mouth disposed off-center with respect to the array centerline, the particular waveguide having a non-adiabatic lateral optical centerline shift no more than 1 mm into the mouth of the particular waveguide.

32. Apparatus according to claim 31, wherein the lateral optical centerline shift occurs no more than 200 um into the mouth of the particular waveguide.

33. Apparatus according to claim 31, wherein the particular waveguide is, at its mouth, oriented so as to excite a first order mode in the portion of the particular waveguide nearest the array output boundary, the first order mode beating against the fundamental mode to yield a light path in the particular waveguide which meanders with a longitudinal beat period, and wherein the lateral optical centerline shift occurs within four of the longitudinal beat periods.

* * * * *